United States Patent [19]

Woolfson et al.

[11] 3,903,357

[45] Sept. 2, 1975

[54] ADAPTIVE GATE VIDEO GRAY LEVEL MEASUREMENT AND TRACKER

[75] Inventors: Martin G. Woolfson; Floyd C. Bentley, both of Baltimore, Md.

[73] Assignee: Westinghouse Electric Corporation, Pittsburgh, Pa.

[22] Filed: Dec. 6, 1971

[21] Appl. No.: 205,090

[52] U.S. Cl. .......................... 178/6.8; 178/DIG. 21

[51] Int. Cl.[2] .......................... H04N 7/18

[58] Field of Search ....... 178/DIG. 21, 6.8, DIG. 34, 178/DIG. 37

[56] References Cited

UNITED STATES PATENTS 3,617,631 11/1971 Soames .............................. 178/6.8

OTHER PUBLICATIONS

Lowenstein – A TV system with automatic target tracking capability – Jour. of SMPTC – Vol. 76 – Dec. 1967 – pp. 1189–1192.

*Primary Examiner*—Howard W. Britton
*Attorney, Agent, or Firm*—D. Schron

[57] ABSTRACT

A method and apparatus employing a television system for tracking a target having a plurality of disjointed regions of different gray levels wherein one of the regions is selected as representative of the target and is defined by the smallest enclosing track rectangle. The target is positioned to appear in the area defined by the measurement window located at the centroid of the track rectangle and the video gray level appearing in the measurement window is obtained through an amplitude search. The coordinates of the geometrical center of the track rectangle is taken as the track point on the target and the target is tracked by obtaining sample distribution measurements of target gray level to again define the selected region by the smallest enclosing track rectangle and determining the coordinates of the geometrical center thereof as the track point, to fix target translation. The selected region is defined by positioning a plurality of tracking gates over the field of view of the target and error signals are generated to effect correct positioning whereby the region is defined by the smallest enclosing track rectangle.

39 Claims, 17 Drawing Figures

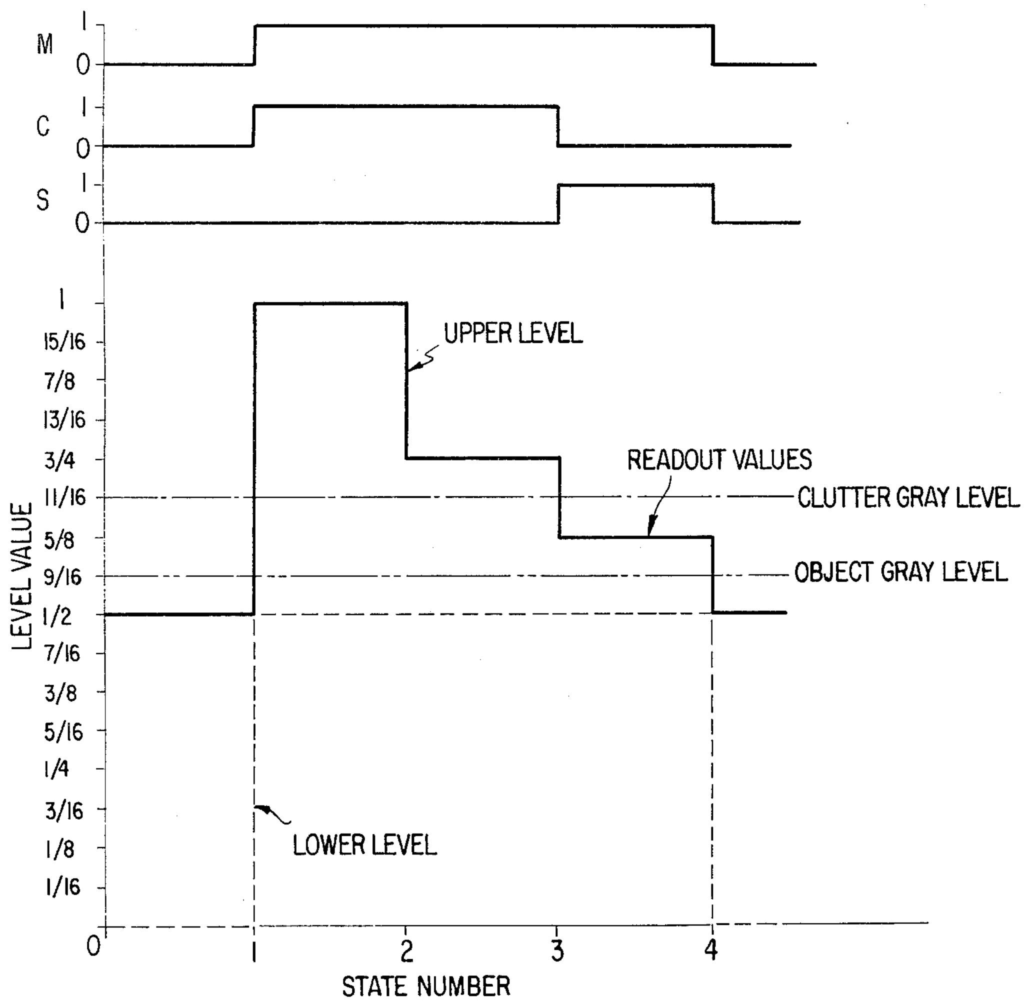
FIG. 10 GRAY LEVEL SEARCH
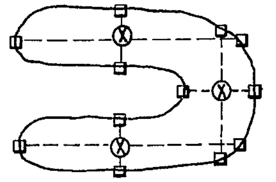
FIG. 13
FIG. 12
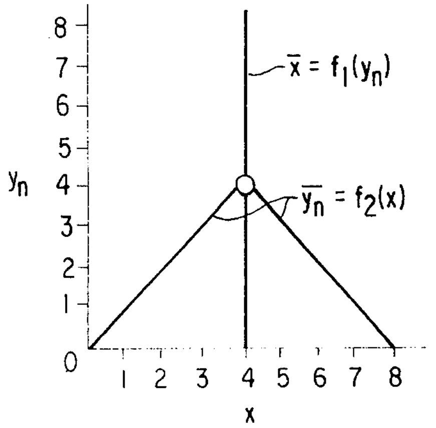
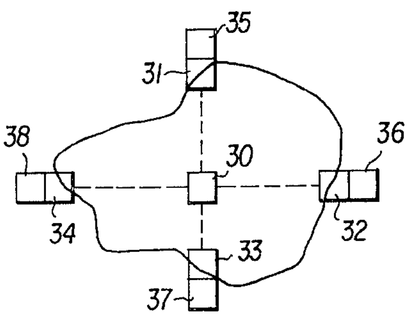
FIG. 9

ADAPTIVE GATE VIDEO GRAY LEVEL MEASUREMENT AND TRACKER

BACKGROUND OF THE INVENTION

1. Field of the Invention

The invention relates to a TV video tracker system using gray level measurement and has particular utility for tracking objects in a high-clutter environment. One typical use of the system according to the invention is an air-to-ground tracking system wherein many objects in the immediate vicinity of the object being tracked, conventionally knonw as the "target," complete for "capture" or lock-on by the tracker.

2. State of the Prior Art

There are systems known in the prior art for tracking targets. These, however, normally operate by measuring video gradients and require automatic gain control or division operations to maintain tracking loop stability and other loop operating characteristics of the system. This necessitates the use of complex circuitry in order to ensure acceptable system operating characteristics, especially under high-clutter background conditions.

SUMMARY OF THE INVENTION

These and other disadvantages of the prior art are solved by applicants' invention which extracts target gray level as the prime feature of the target for tracking purposes. Many targets are variegated, that is, represented by a union of disjoint regions having different gray levels or gray tones. The system according to the invention selects one of these regions as being representative of the target and determines the gray level of the selected region and the smallest rectangle in which it can be enclosed. The determination of the smallest enclosing rectangle for the selected region provides an adaptive character to the system because the size of the rectangle will vary as the target rotates or dilates. The geometric center of the rectangle is taken as the track point on the target to enable target translation to be determined by measurement of the coordinates of the center of the rectangle.

The smallest enclosing track rectangle for the selected region is determined by four tracking gates positioned in orthogonal relationship. Processing is essentially the same in each channel or circuit associated with the tracking gates.

In one embodiment of the invention, a discriminator characteristic is obtained from measurements of a sample distribution of target gray level and the resultant discriminator error signal is zero when its control level and the main target gray level are coincident. Signals of interest are those which occur in the region defined by the gray level measurement gate. After the gray level is determined, the gray level loop is closed and in track condition. This condition initiates the track acquisition cycle.

In another embodiment, the gray level measurement circuit according to the invention provides for rapid acquisition of target gray level and optimization of gray level slice width, which enables tracking of targets having minimal contrast with the immediate surrounding environment and compensates for changes in video signal level. Applicants' circuit functions in the same processing bandwidth in a manner which does not vary the loop gain as a function of target size or aspect. This alleviates the necessity in prior art circuits which require automatic gain control or division operations to maintain loop stability and other loop operating characteristics.

BRIEF DESCRIPTION OF THE DRAWINGS

FIG. 9 illustrates the positioning of the measurement and tracking windows in the field of the TV system utilized in conjunction with the gray level measurement circuit shown in FIG. 8;

FIG. 10 is a series of graphs illustrating a typical search procedure utilized in the circuit according to FIG. 8, and particularly the progression of upper and lower voltage levels defining the gray level slice;

FIG. 12 is a composite plot corresponding to the target shown in FIG. 11 illustrating track point determination;

FIG. 13 shows that a plurality of track points depending upon the shape of the display may be obtained;

DETAILED DESCRIPTION OF THE INVENTION

Figure 1:
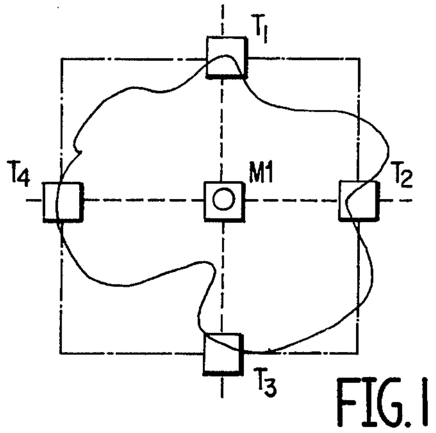
FIG. 1 is a view of the target illustrating the four tracking gates defining the smallest rectangle enclosing the selected target region with the measurement window at the centroid thereof.

The smallest enclosing track rectangle for the selected target region is determined by four tracking gates T1-T4 as shown in FIG. 1. The system according to the invention provides gray level tracking to develop a binary pattern representation from the multiple gray tone video presented to the tracker. Video occurring within a given gray level slice or range is assigned the logic level +1 and all other video is assigned the logic level −1.

A measurement window generated at the centroid of the track rectangle formed by the tracking gates is positioned over the target of interest as shown in FIG. 1.

One manner by which positioning may be accomplished is by changing the line of sight of the TV system until the desired target appears in the small region defined by the measurement gate M1. The video gray level appearing in the measurement gate is determined by an amplitude search, and is then tracked to compensate for changes in video level which may be caused either at the target or by automatic gain control of the television system.

Figure 14:
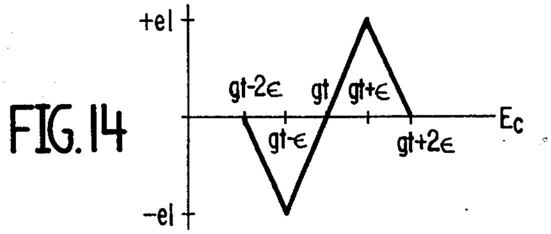
FIG. 14 is a graph showing the discriminator characteristic.

The gray level tracker determines the track point based on the measurements of a sample distribution of target gray level. The output of a gray level slicer and associated circuitry measured at the termination of each TV frame is proportional to the probability that the target gray level lies within the gray level slice. A gray level discriminator characteristic is obtained from these measurements with the resultant discriminator error signal being zero when the control value and the mean target gray level are coincident. FIG. 14 shows the discriminator characteristic with the sawtooth sweep control voltage $E_c$ causing a zero discriminator error signal when it corresponds to the target gray level. The target gray level is not atomic but is distributed over a range of values because of the presence of noise within the processing circuitry. The signals of interest are those which occur in the region defined by the gray level measurement gate.

Figure 2:
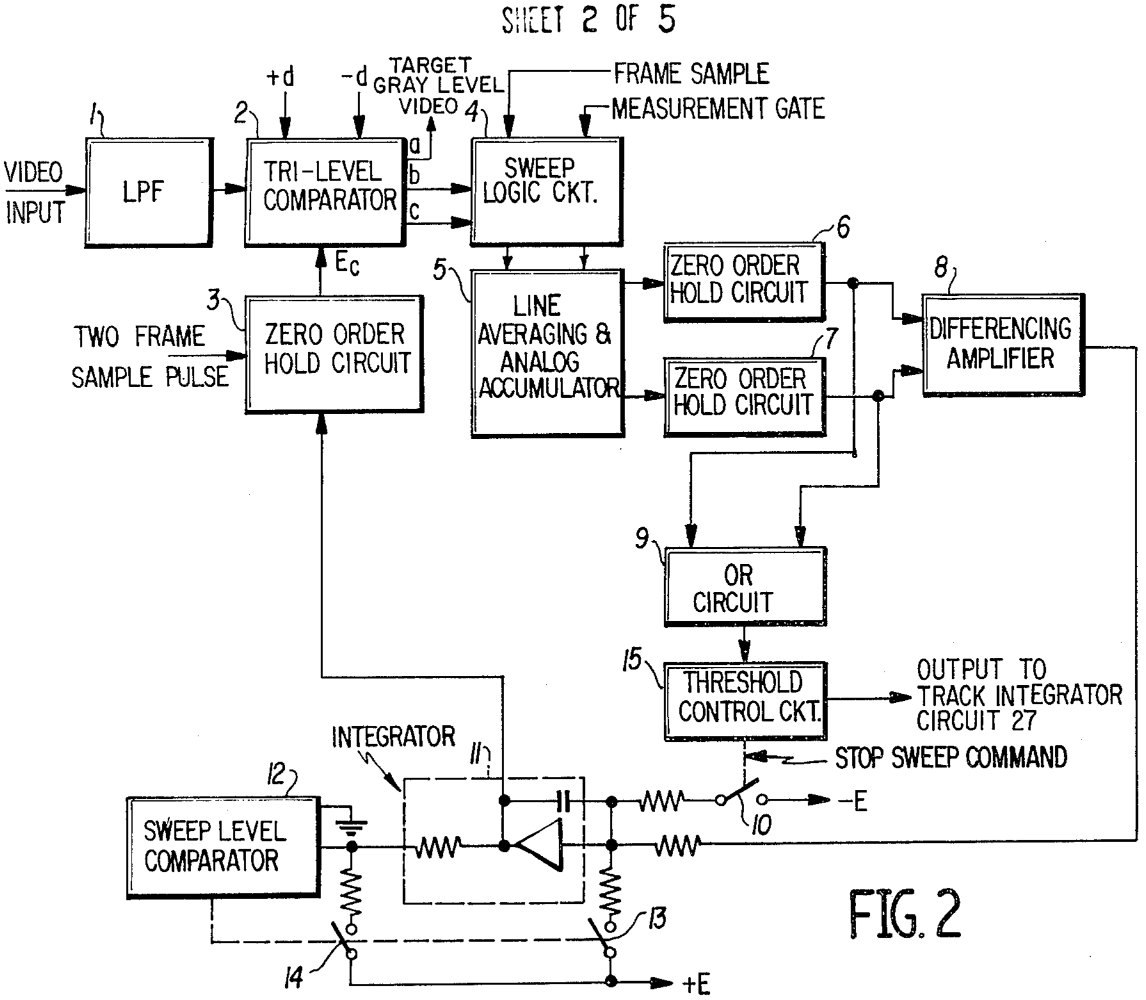
FIG. 2 is an electrical schematic diagram of a circuit showing one embodiment of the invention for gray level measurement.

Target gray level is determined by using a search sweep control voltage to determine the level in the range of the gray level discriminator. After a stop sweep command, the level at discriminator zero value is obtained through a control loop. Details regarding determination of target gray level and positioning of the tracking gates are given hereafter:

FIG. 2 shows a circuit according to the invention for gray level measurement wherein the input video is applied to low pass filter 1 which determines the video bandwidth for both the gray level and video tracking loops. However, it is not essential to use the low pass filter, and video bandwidth can be determined in other ways. In the event the low pass filter is used, it is connected to the input of tri-level comparator 2, which has three outputs.

Control voltage $E_c$ is applied by zero order hold circuit 3 to control the output of tri-level comparator 2. The control voltage $E_c$ at the output of zero order hold circuit 3 is determined from a sampling of the output of integrator 11, and is held for two frame times. The three outputs of tri-level comparator 2 are designated $a$, $b$ and $c$ and the following conditions where logic 1 are generated at each of the three outputs exist, Output $a$ is $a$ one if $E_c - d \leq V \leq E_c + d$ Output $b$ is $a$ one if $E_c - d \leq V \leq E_c$ Output $c$ is $a$ one if $E_c \leq V \leq E_c + d$, where $d$ is a small differential voltage and V is the voltage corresponding to the applied video gray level.

Outputs $b$ and $c$ of tri-level comparator 2 are connected to sweep logic circuit 4 which functions to gate input video coincident with the measurement gate to a line averaging circuit and analog accumulator 5 from either output $b$ or $c$ in each TV frame time. Output $a$, which logically is the OR'ed value of outputs $b$ and $c$ and from the above expression will be appreciated to be the gray level video of the target within the gray level slice from $E_c - d$ to $E_c + d$, is supplied to the tracking circuits, as will be described. The line average value is coupled to the analog accumulator which sums the average line voltages over a frame time. The accumulator output is sampled once per frame and coupled to each of zero hold circuits 6 and 7. Zero order hold circuits 6 and 7 are keyed such that each retains its sample value for two partially exclusive frame times. Thus, zero order hold circuit 6 is keyed to receive the accumulation of output $b$ in frames 1, 3, 5, et seq., and zero order hold circuit 7 receives the accumulation of output $c$ in frames 2, 4, 6, et seq. The outputs of zero order hold circuits 6 and 7 are applied to differencing amplifier 8 and to analog OR circuit 9.

In the absence of a stop sweep command, switch 10 is activated to its closed position and connects negative voltage −E to integrator 11 to produce a positive going sweep. If a stop sweep command does not occur before the sweep maximum value is exceeded, sweep level comparator 12 is switched and applied positive voltage +E to the input of integrator 11 by activating switches 13 and 14 to their closed positions. This causes positive voltage +E to be applied to the input of integrator 11 and sweep level comparator 12. Application of the positive voltage to the input of integrator 11 causes a negative integrator output voltage. The sweep level comparator 12 remains in its switched state until the sum of the positive input voltage produced by connecting +E thereto and the negative output voltage supplied by integrator 11 is less than zero. When this condition is reached sweep level comparator 12 switches again to open switches 13 and 14 and thus disconnect the positive voltage +E from the inputs of level comparator 12 and integrator 11. This causes a negative voltage to again be applied to the input of integrator 11, whereby the integrator sweeps positively. If during the sweep cycle the output of analog OR circuit 9 exceeds a present threshold value, indicative that the sweep voltage is near the nominal control level, a stop sweep command is generated by threshold control circuit 15 which causes switch 10 to be activated to the open position thereby removing negative voltage −E from the input of the integrator 11. Integrator 11 thus stores the value it attained prior to removal of the sweep input voltage.

The error voltage produced by the differencing amplifier 8 connected to the outputs of zero order hold circuits 6 and 7, is also applied to the input of integrator 11 and functions as a correction signal to correct the integrator output voltage until the difference between the outputs of zero order hold circuits 6 and 7 average out to zero. When the difference signal between zero order hold outputs 6 and 7 averages out to zero, the error control voltage from differencing amplifier 8 of course is also zero. The gray level loop is then closed and in a track condition. The stop sweep command is also coupled to the track circuits to initiate the track acquisition cycle.

The gray level processor, or gray level measurement circuit, of FIG. 2 produces a binary valued intensity function B (x, $y_n$) where $$B(x, y_n) = \begin{cases} 1, E_c - d \leq Z(x, y_n) \leq E_c + d \\ -1, \text{otherwise} \end{cases}$$

and where Z ($x$, $y_n$) is the point intensity at $x$ and $y_n$, and the interval $[E_c - d, E_c + d]$ defines the gray level slice. In the notation above $x$ is a position on a given horizontal scan line $y_n$ ($n$ is the line number in a given frame. The error relative to a fixed coordinate pair ($x_o$, $y_{no}$) is given by $$e\,(x_o, y_{no}) = K \sum_{n=n_o-m}^{n_o+m} \int_{x_o-\delta/2}^{x_o+\delta/2} Z\,(x, y_n)\,dx$$

The above indicates a horizontal gate δ units wide generated over $2m + 1$ lines in each frame.

For the horizontal channel, $y_{no}$ is fixed and $x_o$ is sought such that $e\,(x_o/y_{no}) = 0$ The notation $(a/b)$ indicates the error relative to a given $b$.

Let $Z_1\,(x, y_n) = 1, (x, y_n) \in G$ $Z_2\,(x, y_n) = -1, (x, y_n) \in G$ $G = \left\{(x, y_n)/-\delta/2 \leq x \leq \delta/2, n_o - m \leq y_n \leq n_o + m\right\}$ For $e\,(x_o/y_{no}) = 0$ $$K \sum_{n=n_o-m}^{n_o+m} \int_{x_o-\delta/2}^{x_o+\delta/2} Z_1\,(x, y_n)\,dx = K \sum_{n=n_o-m}^{n_o+m} \int_{x_o-\delta/2}^{x_o+\delta/2} Z_2\,(x, y_n)dx$$

$$\text{For } K_o = \sum_{n=n_o-m}^{n_o+m} \int_{x_o-\delta/2}^{x_o+\delta/2} dx \quad \textit{then}$$

$$\sum_{n=n_o-m}^{n_o+m} \int_{x_o-\delta/2}^{x_o+\delta/2} Z_1\,(x, y_n)\,dx = K_o/2$$

Hence, on the average, the tracking gate is superimposed on the target such that half of its area is occupied by the gray level region.

Four similar but distinct tracking circuits are employed in the positioning of the tracking gates. The video input is binary as produced by the gray level processor and the video bandwidth may be reduced for tracking by the low pass filter 1 connected to the input to the gray level processor in order that pulse variations in gray level are compatible with the areas occupied by the tracking gates. This improves input signal to noise ratio but reduces resolution between nearby targets of similar gray level. Resolution is limited to the gate dimensions in each axis. Data is processed on each horizontal line within the appropriate tracking gate and accumulated over a TV frame. The process is equivalent to an area measure of error in which the tracking gate is convolved with a binary pattern target of limited area extent. The tracking circuits are conventional and may for example comprise analog range trackers employed in pulse-type radar systems.

The four tracking circuits are coupled in a manner that may be described with reference to FIG. 3. The signs of the error signals in each channel are arranged such that a positive error produces a gate motion away from the center of the system. Similarly, all gates are made to coincide for negative error which occurs at acquisition due to the absence of any target and a −1 indication over the measurement gate area. Thus at acquisition the error outputs are clamped to zero so that all gates appear at a fixed superimposed position within the field of view. At other times, an analog "or" gate is used to prevent the gates from crossing one another when each has a negative error.

The gates are cross coupled using as the reference axis for one pair the average of the coordinates of the other pair. Dependent on the geometry of the target, the errors in each channel may be zero independent of the other. When all errors are zero, the track point is reached. For example, given a value $\overline{y}_n$, there exist pairs of points ($x^1$, $x^2$) such that the errors in the horizontal channel are zero. That is, $$e(x^1/y_n) = 0,\ e\ )x^2/y_n) = 0$$

The reference coordinate to the vertical channel is $$\overline{x} = \frac{x^1 + x^2}{2};$$

$\overline{x}$ is a function of $\overline{y}_n$. Similarly there exist pairs of lines ($y_{n1}$, $y_{n2}$) such that the vertical errors are zero. The reference coordinate is $$\overline{y}_n = \frac{y_{n1} + y_{n2}}{2};$$

$\overline{y}_n$ is a function of $\overline{x}$. It is noted that ($\overline{x}$, $\overline{y}_n$) is the centroid of the tracking gates.

Figure 4:
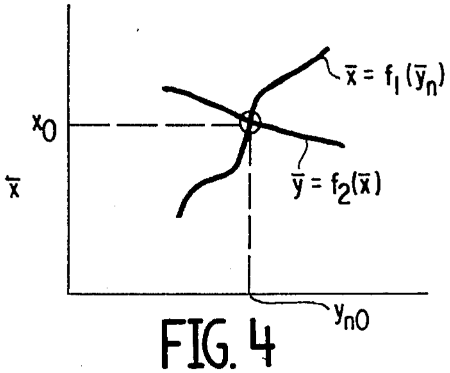
FIG. 4 is a graph showing the manner in which the track point is determined.
Figure 11:
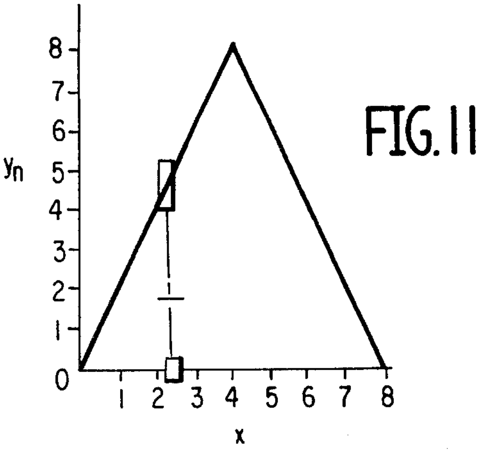
FIG. 11 is a graph illustrating the coordinates of a particular triangular target to show how the track point may be determined.

Assume the given functions are plotted as shown in FIG. 4. The intersection of the two curves yields the track point. To cite a specific example, consider the triangular shaped target shown in FIG. 11. (The coordinates are to an arbitrary scale. The vertical pair is shown in an arbitrary position.)

The following relationships exist:

$y_n = 2\overline{x}_o, 0 < x \leq 4$ $y_n = 8 - 2(\overline{x} - 4), 8 < x \leq 4$ $$\overline{y}_n = \begin{cases} \overline{x}, 0<\overline{x} \leq 4 \\ 4 - 2(\overline{x} - 4), 8<\overline{x} \leq 4; \text{ and } \overline{x}_n = 4, 0<y_n<8 \end{cases}$$

The composite plot ($\overline{x}$, $\overline{y}$) is shown in FIG. 12 of the drawings, with the track point at (4, 4). Then:

$$x_o^1 = 2 \qquad x_o^2 = 6$$
$$y_{n1} = 0 \qquad y_{n2} = 8$$

In the examples shown, the track point was unique. However, this is only true for convex figures. For example, the shape shown in FIG. 13 will have the three track points marked $x$.

The ultimate track point actually acquired for tracking purposes depends both on the geometry of the target and the initial placement of the gates during acquisition. It is further noted that the track point can change with large perturbations produced by noise. The tracker system provides an analog bipolar voltage of the gate centroid coordinates for coupling to any external camera positioning system (not shown) such as an external gimballed servo system, with zero voltage in each channel corresponding to the line of sight of the TV system.

Processing is essentially the same in each of the four channels and differences between comparator scale factors in the horizontal and vertical channels are taken into account in order to provide identical loop bandwidths in the horizontal and vertical channels. Extra gating in the vertical channel is also provided to insure generation of the vertical gate to the nearest line. Intercoupling between the four channels has been discussed in this application heretofore. Consequently, the following discussion will be directed to only one of the track loops.

Figure 6:
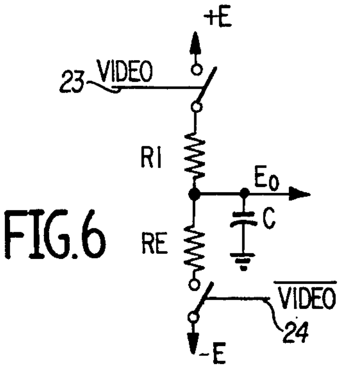
FIG. 6 is an electrical schematic diagram of the bridge circuit of the time discriminator utilized in the circuit of FIG. 5.
Figure 5:
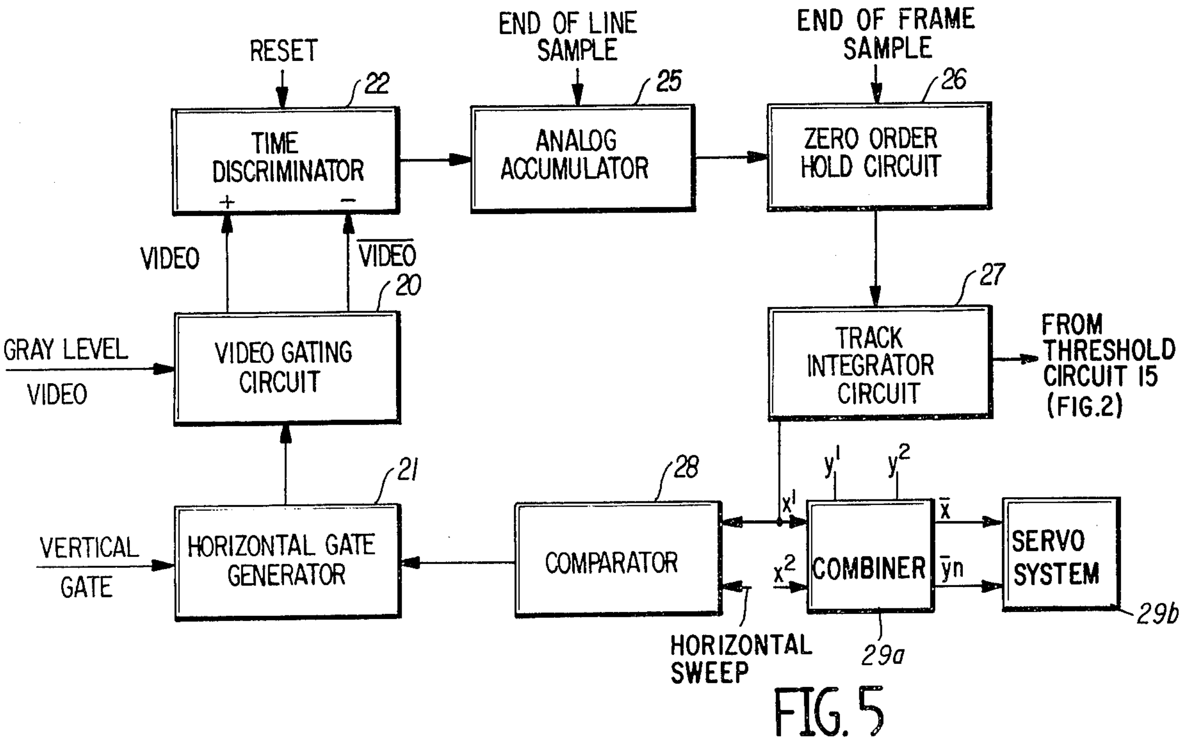
FIG. 5 is a block diagram of a horizontal tracking loop circuit according to the invention.

FIG. 5 is a block diagram of a horizontal tracking loop circuit wherein gray level video is applied to video gating circuit 20. The gray level video is gated by horizontal gate generator 21 and applied to a time discriminator 22. The described discriminator is illustrative of only one particular manner of practicing the invention, and other discriminators may be substituted therefor. The pulse inputs to the time discriminator are both 0–1 logic level shifts which key switches in a bridge circuit of the time discriminator as shown in FIG. 6. The video and $\overline{\text{video}}$ switches 23 and 24 are respectively interposed between the positive (+E) and negative (−E) power supply sources and equal resistors R1 and R2. The series connection of resistors R1 and R2 is connected to one plate of capacitor C, the other plate being connected to ground.

Figure 7:
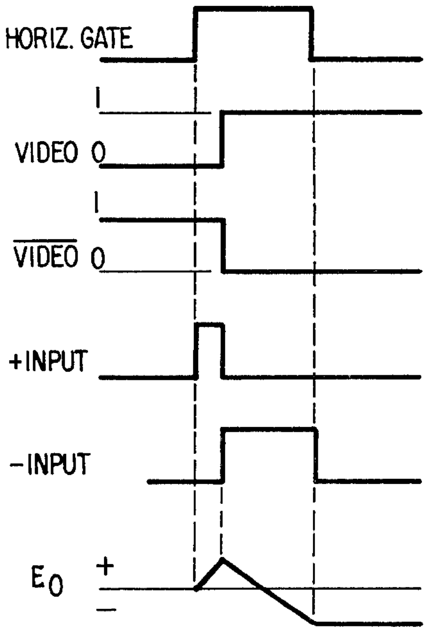
FIG. 7 is a series of graphs illustrating the operation of the circuit of FIG. 6 under the assumed input conditions.

FIG. 7 is a series of graphs illustrating the operation of the circuit of FIG. 6 under the assumed video and $\overline{\text{video}}$ inputs. When the transition is centered in the horizontal gate, the discriminator output voltage $E_o$ at termination of the gate is zero. The output is sampled at the end of each line and coupled to analog accumulator 25. The discriminator capacitor C is then discharged to zero at the end of each line so that the analog accumulator 25 accumulates the sum of the average error per line.

At the end of each TV frame time, the analog accumulator 25 output is sampled and stored in a zero order hold circuit 26 and the analog accumulator 25 is then reset to zero. The output of the zero order hold circuit 26 is representative of the track error and the resultant error voltage is coupled to track integrator circuit 27.

Figure 15:
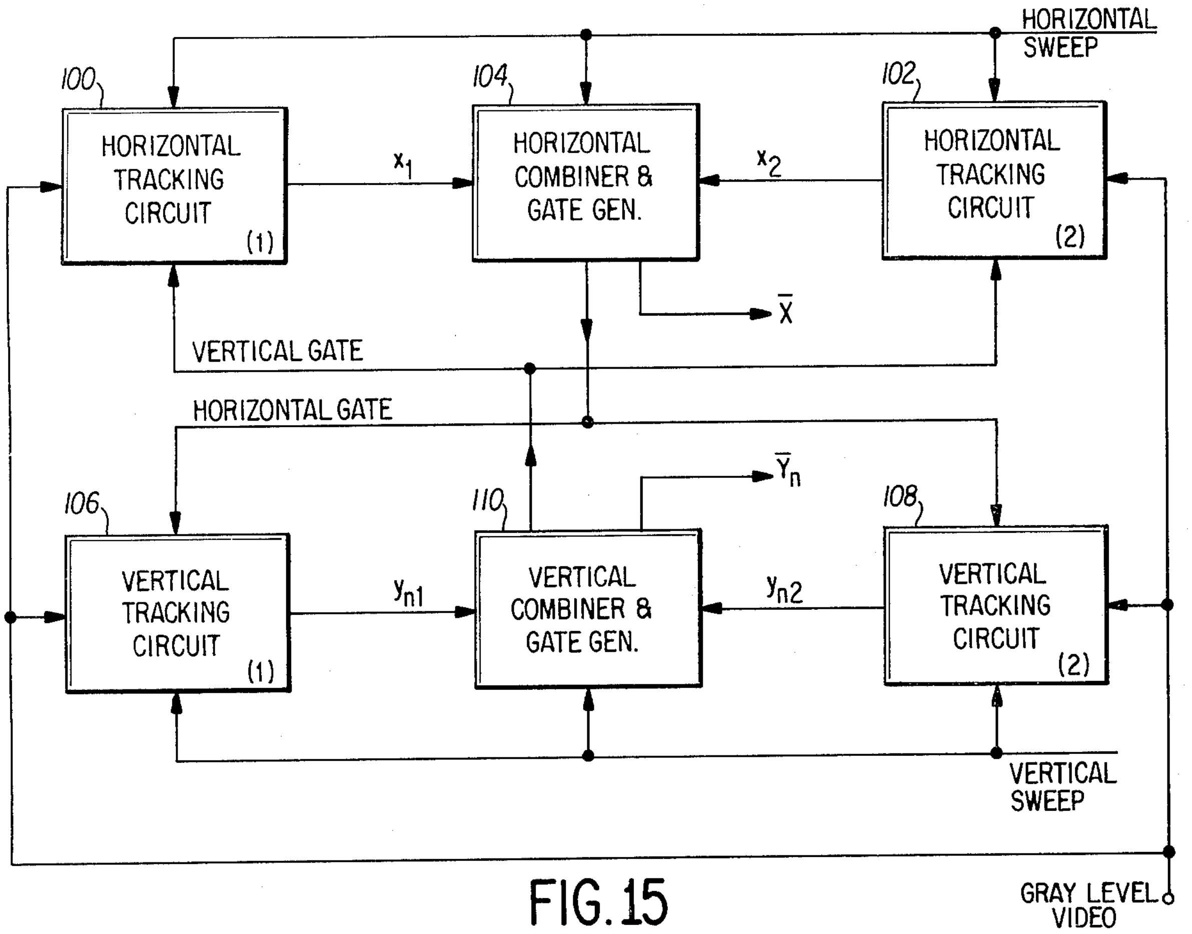
FIG. 15 is a block diagram of the system showing the intercoupling of the four tracking units.

The horizontal gate signal is generated by a trigger signal derived by comparator 28 which compares the output of track integrator circuit 27 with the horizontal sweep. The horizontal signal gate is set so that zero error on the average is provided at the output of the hold circuit 26 which causes the tracking loop to close. FIG. 15 illustrates the intercoupled tracking units as above described. The horizontal tracking circuits 100 and 102 each correspond to FIG. 5 and the combiner 104, to the combiner shown at 29*a* in FIG. 5. The vertical tracking circuits 106 and 108 are the vertical counterparts of horizontal tracking circuits 100 and 102 as is the combiner 110. The functions of these circuits correspond directly to the intercoupling relationships of the windows in FIG. 3 and to the circuit and operations of the illustrative tracking circuit of FIG. 5.

Figure 3:
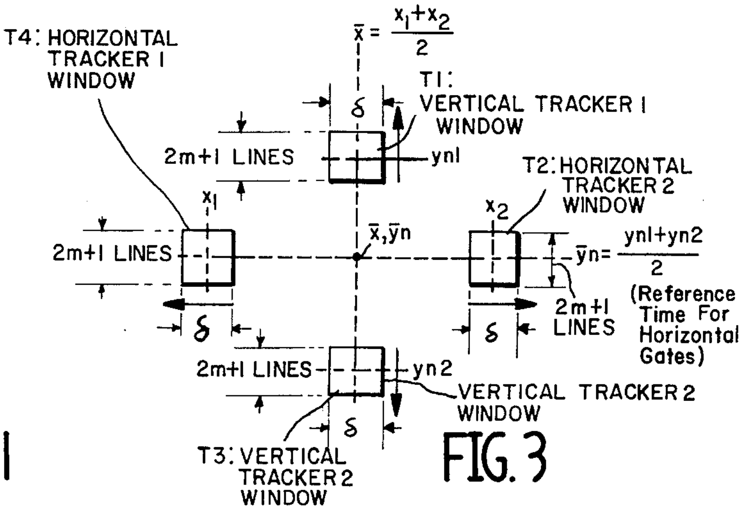
FIG. 3 is a diagram illustrating the coupling of the four tracking circuits and the positive error produced by tracking gate motion away from the center of the system.

Relating FIG. 15 more specifically to FIG. 3, it will be appreciated that the gates generated for the horizontal tracking windows T2 and T4 are centered in time about the values $x_2$ and $x_1$, respectively. Moreover, each gate is of a width δ from the above equation:

$$e(x_o, y_{no}) = K \sum_{n=n_o-m}^{n_o+m} \int_{x_o-\delta/2}^{x_o+\delta/2} Z(x, y_n)\, dx$$

It moreover will be apparent that integration is taken over the gate width from $x_o - \delta/2$ to $x_o + \delta/2$.

The above equation also expresses the operation relative to these vertical gates for the tracking windows T1 and T3.

The vertical gate which corresponds to the vertical coordinates of the horizontal tracking gates T2 and T4 and as well the horizontal gate which corresponds to the vertical tracking windows T1 and T3 again are processed as in the above equation. In this instance, however, the values of $x$ and $y_n$ comprising the terms of the function being integrated are now $\overline{x}$ and $\overline{y}_n$. These values are defined above as follows:

$$\overline{x} = \frac{x_1 + x_2}{2} \text{ and } \overline{y}_n = \frac{y_{n1} + y_{n2}}{2}.$$

In an actual implementation, delta values are added to the sweep, e.g. as a fixed DC bias value, to enable the generation of the gate in the properly centered relation to the $\overline{x}$ and $\overline{y}_n$ values. This, of course, is apparent from the limits on the integral and the limits on the sum.

Figure 16A:
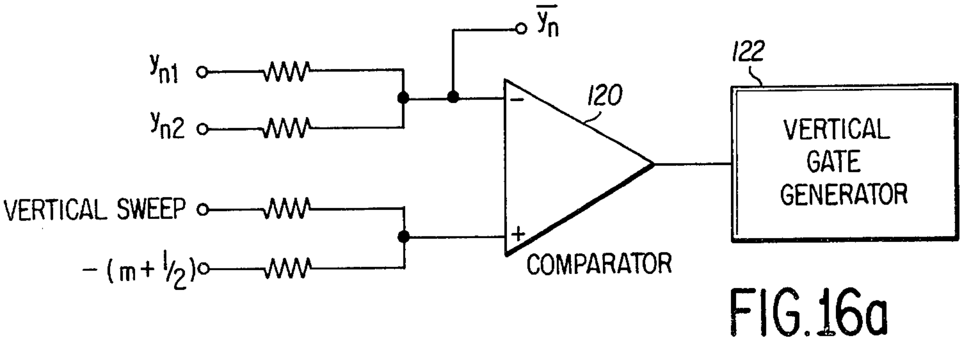
FIGS. 16*a* and 16*b* illustrate the circuit configuration of a combiner and gate generator of FIG. 15 for the *x* and *y* gates.
Figure 16B:
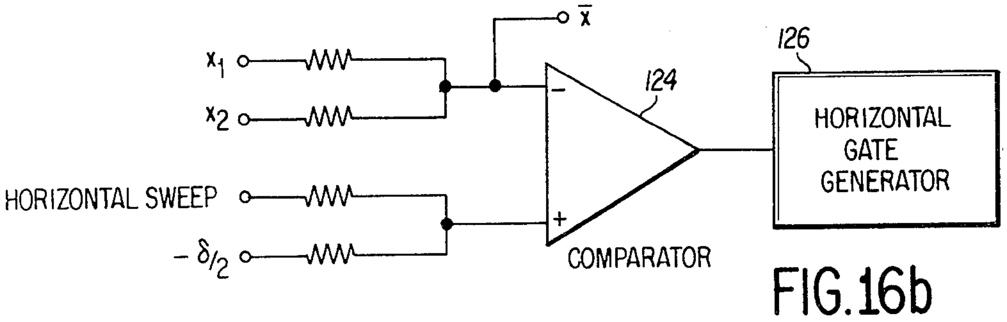

The foregoing operations may readily be performed in accordance with the circuits of FIGS. 16*a* and 16*b*. FIG. 16*a* shows the conventional manner of implementing the equation for $\overline{y}_n$ from the inputs $y_{n1}$ and $y_{n2}$ as a first input to a 120 functioning as the combiner portion of the combiner and gate generator 110 of FIG. 15. The vertical sweep as shown in FIG. 15 as well is supplied as an input. The above mentioned bias value of $-(m+1/2)$ then is supplied to permit the gate to be generated at an initial offset from the $\overline{y}_n$ value. The output of comparator 120 then is supplied to the vertical gate generator 122, which vertical gate then is supplied to the horizontal tracking circuits 100 and 102 in FIG. 15. From FIG. 3, this vertical gate then defines the vertical positions of the horizontal tracking windows T2 and T4.

In like manner, FIG 16*b* illustrates the implementation of the functions for generation of the horizontal gate, corresponding to the horizontal combiner and gate generator 104 of FIG. 15, and utilizing a comparator 124 and a horizontal gate generator 126. Relating this to FIG. 3, the horizontal gate thus produced defines the horizontal time for locating the vertical tracking windows T1 and T3.

Figure 8:
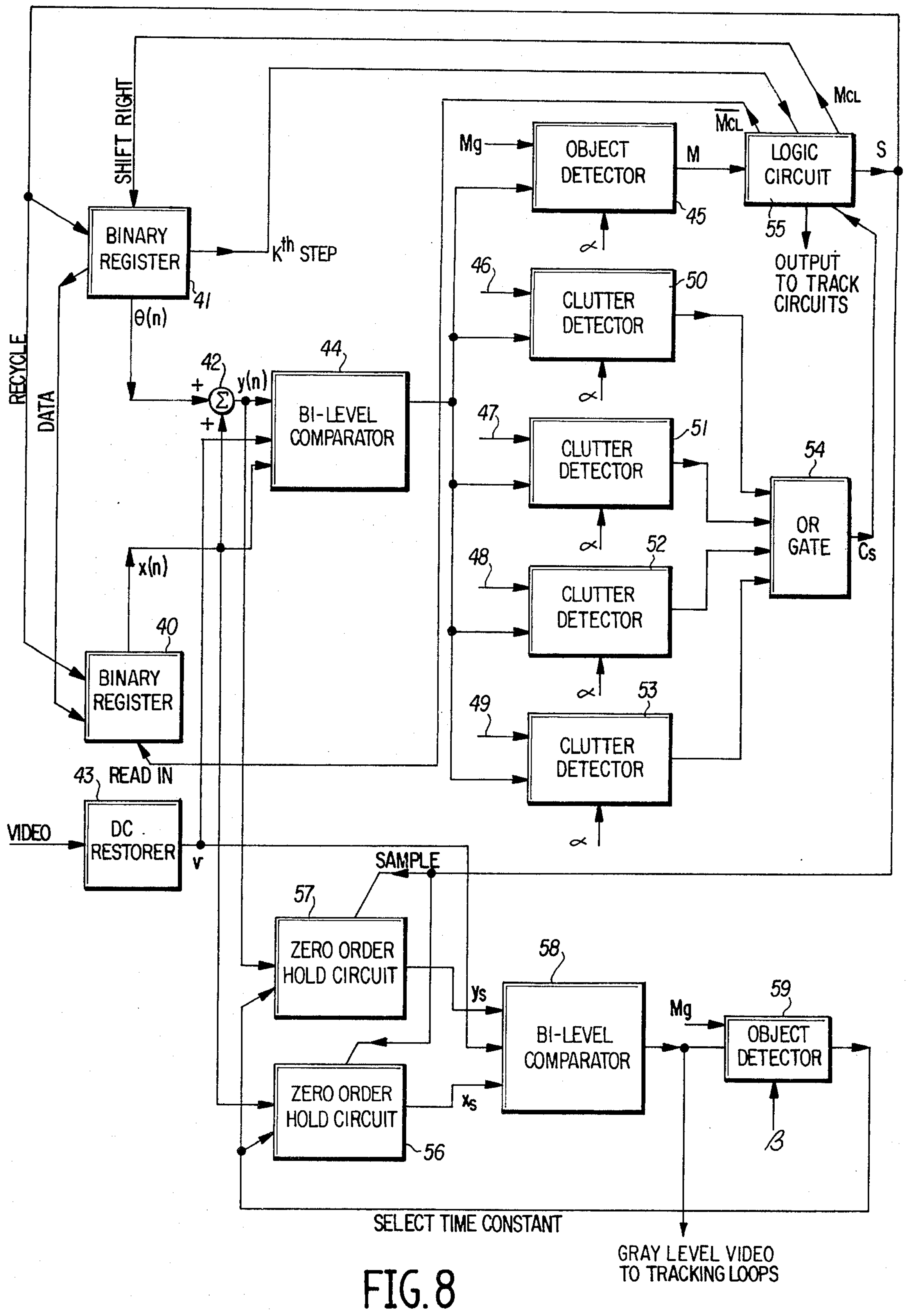
FIG. 8 is an electrical schematic diagram of another embodiment of a gray level measurement system according to the invention which provides for rapid acquisition of target gray level.

FIG. 8 shows a gray level measurement system according to the invention which provides for rapid acquisition of target gray level and optimization of the gray level slice width. Optimization of gray level slice width enables the tracking of targets having minimal contrast with the immediate surrounding environment and compensates for changes in video signal level gain.

FIG. 9 shows the positioning of the measurement and tracking windows in the field of view of the TV system, wherein 30 is the measurement window, 31 through 34 the tracking windows, and 35 through 38 the clutter windows.

The target region is confined by the four tracking windows 31 through 34 which define the target region by a rectangle of minimum area as described heretofore. The gray level of the object being tracked is defined as the average video level thereof, which is determined by measurement window 30 superimposed on the object being tracked.

Clutter windows 35 through 38 provide background or clutter measurements, and are respectively positioned adjacent tracking windows 31 through 34. The clutter windows measure the gray level in the region immediately outside the region of the object being tracked, to within the resolution of the clutter windows. The system is designed such that the background or clutter gray level in any of the four windows 35 through 38 which is closest to object gray level, dominates the other clutter measurements.

The region defining the tracked object is determined by the video levels that lie in a slice centered about the nominal video level measured in window 30. The slice width is defined by upper and lower limit voltages $V_U$ and $V_L$, respectively, and binary video is determined according to the relationship:

$$B_n(t) = \begin{cases} 1, V_L \leq \nu_n(t) \leq V_U & \frac{n-1}{f_H} \leq t \leq \frac{n}{f_H} \\ 0 \text{ otherwise} \end{cases}$$

where $\nu_{n(t)}$ is the video voltage on the $n^{th}$ raster scan and $f_H$ is the horizontal scan rate.

In the following relationships, the various terms are defined as:

M = object gray level in window M $C_i$ = clutter gray level in window $C_i$; $i$ = 35, —,38

$C_s$ is the selected clutter value from windows 35 through 38 which comes to the gray level of the measurement window, that is, the value which minimizes $[M - C_i]$; $i$ = 35, —,38.

The system determines the maximum slice width $[V_L, V_U]^*$ by employing a sequential search procedure such that $M(\nu(t)/M) \geq \alpha$ $M(\nu(t)/C_s) < \alpha$ where $M(\nu(t)/.)$ is a measure relating to the fraction of a given window (.) for which the video in that window is a one.

The algorithm is constructed using binary steps to simultaneously determine the upper and lower gay level threshold values. The search procedure is repetitive and recycles after each stop indication occurs. Threshold levels to a second video quantizer are determined during the interval just prior to the recycle time.

The search logic is augmented with additional logic as explained hereafter.

Let $x(n)$ = lower level value in state $n$ $y(n)$ = upper level value in state $n$ $\theta(n)$ = gray slice width = $y(n) - x(n)$ M = object detection C = clutter detection S = stop indication M, C, S $\epsilon \{0,1\}$ $x(0) = 0$ $y(0) = 1/2$ The following truth table, Table 1, is employed:

Table 1

Truth Table Search Algorithm

| | | | | |
|---|---|---|---|---|
| $M$ | 0 | 0 | 1 | 1 |
| $C$ | 0 | 1 | 1 | 0 |
| $S$ | 0 | 0 | 0 | 1 |
| $x(n+1)$ | $x(n) + \theta(n)$ | $x(n) + \theta(n)$ | $x(n)$ | $x(0)$ |
| $\theta(n+1)$ | $\theta(n)$ | $\theta(n)$ | $\frac{1}{2}\theta(n)$ | $\theta(0)$ |
| $y(n+1) = x(n+1) + \theta(n+1)$ | | | | |

For low signal to noise conditions or when the image in the field of view is changed rapidly, two consecutive zero states for M may occur. The condition is detected and recycles the system. Another special condition arises during initial acquisition. For this case, the tracking and clutter gates might all be superimposed on a region of the same gray level and a stop indication cannot occur. The search is limited to K steps such that if no stop occurs at the Kth step and M is a one, the levels at the Kth step are read out and the system is recycled. As an example, suppose that object gray level is 9/16 and clutter gray level is 11/16. The progression of the upper and lower levels for this case is shown in FIG. 10.

The gray level measurement system shown in FIG. 8 operates by taking measurements during the active scan time and making computations during the vertical blanking time. Binary registers 40 and 41 are programmed to produce the progression of levels $\theta(n)$ and $x(n)$, respectively, discussed above. The outputs of binary registers 40 and 41 are applied to summing circuit 42 which develops the value $y(n) = x(n) + \theta(n)$. The applied input video is set within the range $x(n) < \nu < y(n)$ in the DC restorer 43.

The output of DC restorer 43, summing circuit 42 and binary register 40 are applied to bilevel comparator 44 which produces a logic 1 output when the condition $x(n) < \nu < y(n)$ is met, and a logic 0 otherwise.

The output of bilevel comparator 44 is gated with the object window output $M_G$ into object detector 45. If the object detections exceed the threshold value $\alpha$, the output of object detector is a logic 1. Each of the four clutter gates 46 through 49 respectively enable the inputs to the four clutter detectors 50 through 53 from bilevel comparator 44. Clutter detectors are thresholded for operation with the value $\alpha$ and if the clutter detections exceed the threshold value $\alpha$, a logic 1 is read out of the corresponding output line. The output lines of the clutter detectors 50 through 53 are connected to OR gate 54 such that a logic 1 on any of the four output lines will cause output $C_S$ of the OR gate 54 to be a logic 1. The output M of object detector 45, the output $C_S$ of OR gate 54, and the $K^{th}$ step of binary register 41 are applied to logic circuit 55 which performs the mathematical operations on M, $C_S$ and the $K^{th}$ step of binary register 41 as previously explained, that is:

(1) $M \cdot \bar{S} = M_{CL}$ (2) $M \cdot \bar{C}_S + K^{th}$ step of 41 = S

Statement (2) above indicates that a stop condition S is satisfied by (a) either the $K^{th}$ step of 41 or (b) the presence of an object (M = 1) and the absence of clutter ($\bar{C}_S = 1$). The generation of a stop signal S by logic circuit 55 will cause the values $x(n)$ and $y(n)$ to be read into zero order hold circuits 56 and 57 respectively, and then reset binary registers 40 and 41.

When a stop condition is not satisfied or $\bar{S} = 1$, then the condition $M = M_{CL} = 1$ will cause a shift right or divide by 2 in binary register 41. The other possible state, $\bar{M}_{CL} = 1$ will initiate a read-in of the contents of binary register 41 into binary register 40 which is equivalent to adding the binary content of the registers because the logic 1's are always in different digit positions in the two registers and do not generate a carry. The outputs of zero order hold circuits 56 and 57, and the output of DC restorer 43 are connected to bilevel comparator 58 which comprises part of the tracking loop. Bilevel comparator 58 generates an output when the condition $x_s < \nu < y_s$ is satisfied, where $x_s$ and $y_s$ are the sampled values of $x(n)$ and $y(n)$ respectively and $\nu$ is the input video at the output of DC restorer 43.

The output of bilevel comparator 58 is connected to the input of object detector 59 which has a threshold of operation value $\beta$. If the output of bilevel comparator 58 exceeds threshold value $\beta$ during the duration of an enabling signal at object gate $M_G$, zero order hold circuits 56 and 57 will select a long time constant which provides a long time average of $x_s$ and $y_s$ to bilevel comparator 58 which results in a reduction of noise and quantization error. The gray level measurement system functions by providing rapid switching between video gray levels associated with different objects and maximizes signal to noise performance by making the gray level window as wide as possible, considering clutter.

What is claimed is:

1. A gray level processor to measure the gray level of input video signals comprising:

input means to receive the input video signals, comparator means connected to the input means to determine if the input video signals lie within a predetermined gray level slice, logic means connected to the comparator means to gate input video signals within the predetermined gray level slice occurring during a fixed measurement gate to control means, the control means being operable to develop a varying sweep control signal for application to the comparator until the logic means indicate that the input video signals lie within the predetermined gray level slice during the fixed measurement gate.

2. A gray level processor as recited in claim 1 further comprising:

correction means connected to the logic means and the control means to generate a correction signal for application to the control means when the input video signals lie within the predetermined gray level slice during the fixed measurement gate, to change the varying sweep control signal until the logic means indicate that the mean value of the gray level has been determined.

3. A gray level processor to measure the gray level of a target in the field of view of a television system, comprising:

first means to obtain a measurement of the target gray level, second means to obtain a measurement of the clutter gray level in the region immediately outside the target region, sequential search means connected to the first and second means operative to obtain an optimum gray level slice width satisfying the conditions that the gray level slice width of the target region is maximized and the clutter gray level is separated from the gray levels within the gray level slice width by a predetermined acceptable amount.

4. A gray level measurement system for use with a television tracking system to provide rapid acquisition of target gray level and optimization of gray level slice width of a selected target region, comprising:

means to provide four tracking windows to confine the selected target region by a rectangle of smallest area, means to provide four clutter windows, each respectively positioned adjacent a tracking window to measure the gray level in the area immediately outside the selected target region, the gray level of the clutter window which is closest to the gray level of the selected target region dominating the other gray level clutter measurements, means to provide a video measurement window at the centroid of the four tracking windows to develop a nominal video level for the selected target region, means for varying gray level thresholds in binary steps during the active scan time of the television system and making computations during the vertical blanking times to produce upper and lower threshold levels about the nominal gray level to determine the optimum gray level slice width which satisfies the condition that the clutter gray level closest thereto may be distinguished from the gray levels in the optimum gray level slice width.

5. A gray level video measurement circuit for use with a television tracking system to provide rapid acquisition of object gray level and optimization of gray level slice width, having an object measurement window positioned in the field of view of the television system to measure the nominal gray level of the object, a plurality of tracking windows positioned in the field of view of the television system to determine the boundaries of the target, the boundaries being set by the gray levels that lie in a gray level slice width centered about the nominal gray level, and a plurality of clutter windows positioned in the field of view of the television system to measure clutter gray level, comprising:

first means programmed to produce a binary progression of lower $x(n)$ and upper $y(n)$ threshold levels, wherein $n$ designates the step in a progression of steps, and the gray level slice width $\theta n$ is equal to $y(n) - x(n)$, DC restorer means connected to receive the applied video ($v$) and set it within the range $x(n)<v<y(n)$, bilevel comparator means connected to receive the outputs of the first means and the DC restorer means and operative to produce a logic 1 output for the condition $x(n)<v<y(n)$, and logic 0 otherwise, an object detector having one input connected to receive the output of the bilevel comparator means, and another input connected to receive the object measurement window, the object detector producing a logic 1 if the gray level output of the bilevel comparator means during the measurement window exceeds a threshold value $\alpha$, a plurality of clutter detectors, each having one input connected to receive the output of the bilevel comparator means and another input connected to receive the corresponding clutter window, and producing a logic 1 if the gray level output of the binary comparator means during its corresponding clutter window exceeds the threshold value $\alpha$, an OR gate connected to receive as inputs the outputs of the plurality of clutter detectors, and operable to produce a logic 1 output if any of the inputs thereto is a logic 1, and a logic 0 otherwise, logic means responsive to a logic 1 output from the object detector and a simultaneous logic 0 output from the OR gate to generate a stop signal S, hold circuits responsive to receive the values of $x(n)$ and $y(n)$ of the first means in response to receipt of the stop signal S from said logic means thereby to establish the gray level slice for the target gray level, and said stop signal S being operable to reset the first means.

6. The gray level measurement circuit as recited in claim 5 wherein the logic means causes the first means to reduce the upper threshold $y(n)$ if the outputs of the object detector and the OR gate are both logic 1.

7. The gray level measurement circuit as recited in claim 6 wherein the logic means causes the first means to increase the lower threshold value $x(n)$ and maintain the gray level slice width $\theta n$ constant when the output of the OR gate is logic 0.

8. The gray level measurement circuit as recited in claim 7 wherein the logic means generates a stop command after a predetermined number of step progressions.

9. A method of tracking a target having a plurality of disjointed regions of different gray levels wherein the target selected as one such region is displayed on the display screen of a television system, the system having a camera for viewing the target and means for positioning the camera to control the position of display of the target on the display screen relative to a predetermined position of the display screen, comprising:

initially selecting one such region as the target and positioning the target on the display screen so as to be superposed at least in part on the predetermined position thereof, defining a measurement gate at the predetermined position of the screen, defining early and late tracking gates for at least one coordinate of the display and initially positioning the tracking gates at the said predetermined position of the display, determining the video gray level of the target in accordance with that level occurring in the measurement gate, upon determination of target gray level, displacing each of the early and late tracking gates initially outwardly from the predetermined position of the display screen in their respective directions for the corresponding coordinate to a position on the boundary of the target region at which each gate includes the target gray level, on the average, within one half of its area, thereby to achieve acquisition of the target, determining the coordinates of the centroid of the early and late tracking gates and producing an error signal representing the displacement of the centroid from the predetermined position of the display screen, and responding to the error signal to adjust the camera position thereby to display the target with the centroid of the tracking gates at the predetermined position of the display screen.

10. A method as recited in claim 9 wherein gray level values of the display other than the target gray level are termed clutter gray level and wherein the step of determining the target gray level comprises:

defining for the total range of video gray level values of a display a binary succession of reduced ranges of gray levels, establishing a desired differential between target gray level and clutter gray level, defining a clutter gate for each tracking gate, displaced immediately adjacent thereto and outwardly thereof relative to the predetermined position in the respective coordinate directions, detecting the gray level value in the measurement gate and in each of the clutter gates in a first video frame of the display, for a first binary range of gray level values and for each successively reduced binary range of the preceding binary range in which target gray level is detected, until target gray level in the absence of clutter gray level in accordance with the established differential therebetween is obtained, and defining the video gray level of the target as that occurring within the said reduced binary range in which target gray level in the absence of object gray level is obtained.

11. A method as recited in claim 9 further comprising:

defining early and late tracking gates for each of horizontal and vertical coordinates of the display, initially positioning the said gates in alignment with the corresponding coordinates and at the said predetermined position of the display, displacing each of the early and late tracking gates in their respective coordinate directions initially outwardly relative to the predetermined position to positions on the boundary of the target region at which each gate includes the target gray level, on the average, within one half of the area of each such gate, determining the coordinates of the centroid of the target in accordance with the coordinates of the early and late gates in each of the coordinate directions, producing an error signal proportional to the displacement of the centroid from the predetermined position of the display screen, and responding to the error signal to adjust the camera position thereby to display the target with the centroid of all tracking gates at the predetermined position of the display screen.

12. A method as recited in claim 11 wherein for each of the said tracking gates, the displacing step comprises:

generating a ramp voltage corresponding to a deflection from one extreme to the other of the display screen, for each coordinate direction, measuring the target gray level occurring within the corresponding tracking gate to determine the effective area of the gate including target gray level, producing a further error signal of an amplitude and polarity corresponding to the ratio of target gray level to non-target gray level within the tracking gate, sampling the further error signal in each display frame for each tracking gate, integrating the sampled, further error signal, comparing the integrated value of the further error signal with the ramp voltage, and generating each gate in response to the ramp voltage equalling the integrated, further error voltage.

13. A method as recited in claim 11 wherein the step of determining the centroid and producing an error signal comprises:

determining the average value of the coordinate positions of the early and late tracking gates in each of the coordinates, relating the said average value of each coordinate as a function of the said average value of the other coordinate thereby to define the centroid of the target as a function of the coordinate positions of the tracking gates, and producing the error signal as a function of the displacement of the centroid from the predetermined position of the display screen.

14. A method of tracking as recited in claim 9 wherein the step of determining the video gray level comprises:

defining first and second contiguous gray level ranges differing from an adjustable control value, by equal but opposite predetermined differentials, accumulating the gray level value during the measurement gate for each of said first and second ranges in corresponding, alternate frames of display of the target, sampling and holding the accumulated video gray level value for each said first and second range in the corresponding time periods, establishing a threshold value and comparing the sampled and held accumulated gray level value for each of the said first and second ranges with that threshold, generating a periodic sawtooth signal as said control value, and discontinuing the sawtooth signal generation of said control value and maintaining the control value at the level of the ramp of the sawtooth, as the nominal value of the adjustable control value, upon the sampled and held accumulated gray level value of either range exceeding the threshold.

15. A method as recited in claim 14 further comprising determining the difference between the sampled and held values of the gray levels of the respective ranges and producing a gray level measurement error signal corresponding to that difference, and adjusting the said nominal control value in accordance with the gray level measurement error signal.

16. A method as recited in claim 14, wherein upon the sampled and held value of the gray level in either of said ranges exceeding said threshold, an output is generated to indicate the determination of target gray level.

17. A method as recited in claim 9 wherein gray level values of the display other than the target gray level are termed clutter gray level and wherein the step of determining the video gray level of the target comprises:

establishing a desired differential between target gray level and clutter gray level, defining for the total range of video gray level values of the display a binary succession of reduced ranges of gray levels, detecting target and clutter gray levels in accordance with the established differential therebetween in a first binary range of the total gray level values of the display and in successively reduced binary ranges of each preceding binary range for which both target and clutter gray level values are detected, until target gray level is detected in the absence of clutter gray level, and defining the video gray level of the target as the said reduced binary range in which target gray level is detected in the absence of clutter gray level.

18. A method as recited in claim 17 wherein each step of said succession of reduced binary ranges and the corresponding detection of video gray level values is performed for corresponding video frames of the display.

19. A method as recited in claim 17 further comprising producing an output indicating the determination of target gray level, thereby to initiate the displacement of the tracking gates for acquisition of the target.

20. A method as recited in claim 19, further comprising establishing a $K^{th}$ binary step of the succession of binary reduced ranges, and accepting the $K^{th}$ reduced binary range as defining the target video gray level when clutter gray level is detected with target gray level in each preceding reduced binary range.

21. A method as recited in claim 20, further comprising producing an output indicating determination of target gray level upon reaching the $K^{th}$ binary reduced range.

22. A method of determining the video gray level of a target contained in a video representation of a display having a plurality of regions of different gray levels, comprising:

initially selecting one such region as the target, defining a measurement gate at a predetermined position of the video display including that target, defining first and second contiguous gray level ranges differing from an adjustable control value, by equal but opposite predetermined differentials, accumulating the gray level value during the measurement gate for each of said first and second ranges in corresponding, alternate frames of display of the target, sampling and holding the accumulated video gray level value for each said first and second range in the corresponding time periods, establishing a threshold value and comparing the accumulated value for each of the said first and second ranges with that threshold, generating a periodic sawtooth signal as said control value, comparing the sampled and held values for the gray level of each of said ranges with the threshold, and discontinuing the sawtooth signal generation of said control value and maintaining the control value at the level of the ramp of the sawtooth, as the nominal value of the adjustable control value, upon the sampled gray level value of either range exceeding the threshold.

23. A method as recited in claim 22 further comprising:

determining the difference between the sampled and held values of the gray levels of the respective ranges and producing a gray level measurement error signal corresponding to that difference, and adjusting the said nominal control value in accordance with the gray level measurement error signal.

24. A method as recited in claim 22, wherein upon the sampled and held value of the gray level in either of said ranges exceeding said threshold, an output is generated to indicate the determination of target gray level.

25. A system for tracking a target having a plurality of disjointed regions of different gray levels wherein the target selected as one such region is displayed on the display screen of a television system, the system having a camera for viewing the target and means for positioning the camera to control the position of display of the target on the display screen relative to a predetermined position of the display screen, one such region initially being selected as the target and positioned on the display screen so as to be superposed at least in part on the predetermined position thereof, comprising:

means for generating a measurement gate at the predetermined position of the screen, means for generating early and late tracking gates for at least one coordinate of the display, said gates initially being positioned at the said predetermined position of the display, means for determining the video gray level of the target in accordance with that level occurring in the measurement gate, means operable in response to the determination of the target gray level for controlling the timing of said gate generating means to displace each of the early and late tracking gates initially outwardly from the predetermined position of the display screen in their respective directions for the corresponding coordinate to a position on the boundary of the target region, means for determining when each said tracking gate includes the target gray level, on the average, within one half of its area, thereby to terminate further initial outward displacement by said displacing means, means for determining the coordinates of the centroid of the early and late tracking gates and producing an error signal representing the displacement of the centroid from the predetermined position of the display screen, and means for responding to the error signal to adjust the camera position thereby to display the target with the centroid of the tracking gates at the predetermined position of the display screen.

26. A system as recited in claim 25 wherein gray level values of the display other than the target gray level are termed clutter gray level and there is established a desired differential between target gray level and clutter gray level, and wherein the means of determining the target gray level comprises:

means for generating a clutter gate associated with each tracking gate and displaced in time immediately adjacent thereto and outwardly thereof relative to the predetermined position in the respective coordinate directions, means for separately detecting the gray level video in the measurement gate and in each of the clutter gates in accordance with the established differential therebetween, means defining for the total range of video gray level values of the display a first binary range of the total gray level values of the display and successively reduced binary ranges of each preceding binary range, means responsive to the outputs of said binary range defining means for supplying video gray levels within the first and each successive binary range to said detectors.

logic means responsive to the outputs of said detectors to cause said binary range defining means to advance to the successive, reduced binary range of each preceding binary range in which target and clutter gray levels are detected and to identify as the target gray level video the binary range in which a target detector output in the absence of a clutter detector output is obtained, thereupon to terminate further advancing of said binary range defining means to a successive reduced binary range, and means responsive to the said identified binary range to supply gray level video within that identified binary range as the target gray level video.

27. A system as recited in claim 25 wherein the means for determining the target video gray level comprises:

means defining first and second contiguous gray level ranges differing from an adjustable control value, by equal but opposite predetermined differentials, and for supplying video gray level outputs within each said range, means responsive to the outputs of said defining means for accumulating the video gray level value during the measurement gate for each of said first and second ranges in corresponding, alternate frames of display of the target, means for sampling and holding the accumulated video gray level value of said accumulating means for each said first and second range in the corresponding time period of the associated frame, means for establishing a threshold value and comparing the accumulated value for each of the said first and second ranges with that threshold and producing an output when either accumulated value exceeds the threshold, and means for generating a periodic sawtooth signal as said control value, and responsive to the output of said threshold establishing and comparing means to discontinue the sawtooth signal generation of said control value and maintain the control value at that value of the sawtooth when discontinued, as the nominal value of the adjustable control value.

28. A system as recited in claim 27 wherein said means for detecting the target video gray level further comprises:

means for determining the difference between the sampled and held values of the gray levels of the respective ranges of said accumulating means and producing a gray level measurement error signal corresponding to that difference, and means for adjusting the said nominal control value of said sawtooth generating means in accordance with the gray level measurement error signal.

29. A system as recited in claim 25 wherein there is further provided;

means for generating early and late tracking gates in each of horizontal and vertical coordinates of the display, said gates initially being positioned in alignment with the corresponding coordinates and at the said predetermined position of the display, said displacing means independently displacing each of the early and late tracking agents in their respective coordinate directions initially outwardly relative to the predetermined position to positions on the boundary of the target region at which each gate includes the target gray level, on the average, within one half of the area of each such gate, and said coordinate determining means determines the coordinates of the centroid of the target in accordance with the coordinates of the early and late gates in each of the coordinate directions.

30. A system as recited in claim 29 wherein for each of the said tracking gates, the displacing means comprises:

means for supplying a ramp voltage corresponding to a deflection from one extreme to the other of the display screen, for each coordinate direction, said means for determining when each tracking gate includes the target gray level within one half of its area produces a further error signal of an amplitude and polarity corresponding to the ratio of target gray level to nontarget gray level within the tracking gate, and there is further provided means for sampling the further error signal in each display frame for each tracking gate, means for integrating the sampled, further error signal for each tracking gate, means for comparing the integrated value of the further error signal with the ramp voltage, and producing an output when the error signal and ramp voltage are equal, and said displacing means is responsive to the output of said comparing means to adjust the timing of the generation of said tracking gate.

31. A system as recited in claim 29 wherein the means for determining the centroid and producing an error signal comprises:

means for determining the average value of the coordinate positions of the early and late tracking gates in each of the coordinates and for relating the said average value of each coordinate as a function of the said average value of the other coordinate thereby to define the centroid of the target as a function of the coordinate positions of the tracking gates.

32. A system as recited in claim 25 wherein gray level values of the display other than the target gray level are termed clutter gray level and there is established a desired differential between target gray level and clutter gray level, and wherein the means for determining the video gray level of the target comprises:

means for separately detecting target and clutter gray levels in accordance with the established differential therebetween, means defining for the total range of video gray level values of the display a first binary range of the total gray level values of the display and successively reduced binary ranges of each preceding binary range, means responsive to the outputs of said binary range defining means for supplying video gray levels within the first and each successive binary range to said detectors, logic means responsive to the outputs of said detectors to cause said binary range defining means to advance to the successive, reduced binary range of each preceding binary range in which target and clutter gray levels are detected and to identify as the target gray level video the binary range in which a target detector output in the absence of a clutter detector output is obtained, thereupon to terminate further advancing of said binary range defining means to a successive reduced binary range, and means responsive to the said identified binary range to supply gray level video within that identified binary range as the target gray level video.

33. A system as recited in claim 32 wherein said logic means produces an output to said gate displacing means to indicate the determination of target gray level, thereby to initiate the displacement of the tracking gates for acquisition of the target.

34. A system as recited in claim 33, wherein:

said binary range defining means defines a $K^{th}$ maximum binary step of the succession of binary reduced ranges, and said logic means responds to said binary range defining means advancing to the $K^{th}$ reduced binary range to identify that $K^{th}$ range as the target gray level video.

35. A system for determining the video gray level of a target contained in a video representation of a display having a plurality of regions of different gray levels, the target initially being positioned at a predetermined position of the display, comprising:

means for generating a measurement gate at the predetermined position of the display, means defining first and second contiguous gray level ranges differing from an adjustable control value, by equal but opposite predetermined differentials, and receiving the gray level video of the display for supplying video gray level outputs within each said range, means responsive to the outputs of said defining means for accumulating the video gray level value during the measurement gate for each of said first and second ranges in corresponding, alternate frames of display of the target, means for sampling and holding the accumulated video gray level value of said accumulating means for each said first and second range in the corresponding time period of the associated frame, means for establishing a threshold value and comparing the accumulated value for each of the said first and second ranges with that threshold and producing an output when either accumulated value exceeds the threshold, and means for generating a periodic sawtooth signal as said control value, and responsive to the output of said threshold establishing and comparing means to discontinue the sawtooth signal generation of said control value and maintain the control value at that value of the sawtooth when discontinued, as the nominal value of the adjustable control value, thereby to define the target gray level as occurring within the said first and second ranges relative to said control value.

36. A system as recited in claim 35 wherein said means for detecting the target video gray level further comprises:

means for determining the difference between the respective sampled and held values of the gray levels of said accumulating means for the first and second ranges and producing a gray level measurement error signal corresponding to that difference, and means for adjusting the said nominal control value of said sawtooth generating means in accordance with the gray level measurement error signal.

37. A system for determining the video gray level of a target contained in a video representation of a display having a plurality of regions of different gray levels, the target initially being positioned at a predetermined position of the display wherein gray level values of the display other than the target gray level are termed clutter gray level and there is established a desired differential between target gray level and clutter gray level, comprising:

means for generating a measurement gate at the predetermined position of the display, means for separately detecting target and clutter gray levels in accordance with the established differential therebetween, means defining for the total range of video gray level values of the display a first binary range of the total gray level values of the display and successively reduced binary ranges of each preceding binary range, means responsive to the outputs of said binary range defining means for supplying video gray levels within the first and each successive binary range to said detectors, logic means responsive to the outputs of said detectors to cause said binary range defining means to advance to the successive, reduced binary range of each preceding binary range in which target and clutter gray levels are detected and to identify as the target gray level video the binary range in which a target detector output in the absence of a clutter detector output is obtained, thereupon to terminate further advancing of said binary range defining means to a successive reduced binary range, and means responsive to the said identified binary range to supply gray level video within that identified binary range as the target gray level video.

38. A system as recited in claim 37, wherein:

said binary range defining means defines a $K^{th}$ maximum binary step of the succession of binary reduced ranges, and said logic means responds to said binary range defining means advancing to the $K^{th}$ reduced binary range to identify that $K^{th}$ range as the target gray level video.

39. A system for determining the video gray level of a target contained in a video representation of a display having a plurality of regions of different gray levels, the target initially being positioned at a predetermined position of the display, wherein gray level values of the display other than the target gray level are termed clutter gray level and there is established a desired differential between target gray level and clutter gray level, comprising:

means for generating a measurement gate at the predetermined position of the display, means for generating a clutter gate associated with each tracking gate and displaced in time immediately adjacent thereto and outwardly thereof relative to the predetermined position in the respective coordinate directions, means for separately detecting the gray level video in the measurement gate and in each of the clutter gates in accordance with the established differential therebetween, means defining for the total range of video gray level values of the display a first binary range of the total gray level values of the display and successively reduced binary ranges of each preceding binary range, means responsive to the outputs of said binary range defining means for supplying video gray levels within the first and each successive binary range to said detectors, logic means responsive to the outputs of said detectors to cause said binary range defining means to advance to the successive, reduced binary range for each preceding binary range in which target and clutter gray levels are detected and to identify as the target gray level video the binary range in which a target detector output in the absence of a clutter detector output is obtained, thereupon to terminate further advancing of said binary range defining means to a successive reduced binary range, and means responsive to the said identified binary range to supply gray level video within that identified binary range as the target gray level video.

* * * * *